(12) United States Patent
Zhang et al.

(10) Patent No.: US 8,222,572 B2
(45) Date of Patent: Jul. 17, 2012

(54) STEAM GENERATOR FOR FOOD PROCESSOR

(75) Inventors: Huaili Zhang, Fujian (CN); Yunhua Chen, Fujian (CN); Chihming Wen, Tao yuan County (TW)

(73) Assignee: Tsann Kuen (China) Enterprise Co., Ltd., Xiamen, Fujian (CN)

( * ) Notice: Subject to any disclaimer, the term of this patent is extended or adjusted under 35 U.S.C. 154(b) by 934 days.

(21) Appl. No.: 12/239,935

(22) Filed: Sep. 29, 2008
(Under 37 CFR 1.47)

(65) Prior Publication Data
US 2009/0212045 A1    Aug. 27, 2009

(30) Foreign Application Priority Data

Sep. 29, 2007    (CN) ...................... 2007 2 0008407 U

(51) Int. Cl.
*H05B 6/80* (2006.01)
*F22B 1/28* (2006.01)
*F22B 27/00* (2006.01)

(52) U.S. Cl. ......... 219/401; 219/682; 392/399; 392/401

(58) Field of Classification Search .................. 219/682, 219/385, 401; 99/330, 339, 467, 476, 483, 99/516; 392/399, 401
See application file for complete search history.

(56) References Cited

U.S. PATENT DOCUMENTS

| | | | | |
|---|---|---|---|---|
| 5,313,550 A | * | 5/1994 | Crosnier et al. | 392/325 |
| 5,361,322 A | * | 11/1994 | Glucksman | 392/405 |
| 5,515,773 A | * | 5/1996 | Bullard | 99/330 |

\* cited by examiner

*Primary Examiner* — Henry Yuen
*Assistant Examiner* — Jianying Atkisson
(74) *Attorney, Agent, or Firm* — Kening Li; Pinsent Masons LLP

(57) ABSTRACT

A steam generator for food processor comprising a shell separated into a sink and a steam generating chamber, wherein the sink has an inlet for importing water from a water source, and the bottom of the sink has an outlet in communication with the steam generating chamber, wherein the generating chamber comprises a heater inside for heating the flowed-in water, as well as a steam outlet. The steam generator is separated from the cavity of the food processor and will not be polluted by the food, so that the generated steam remains pure, which ensures food safety and the taste, and the heating unit of the steam generating device does not connect with the cavity of the microwave oven, so the cavity will not be distorted.

9 Claims, 3 Drawing Sheets

STEAM GENERATOR FOR FOOD PROCESSOR

FIELD OF THE INVENTION

The present invention relates to an auxiliary device for food processors, more particularly to a steam generator used for food processors.

BACKGROUND OF THE INVENTION

The main working principle of the microwave oven is to transform the electric energy into high-frequency microwave energy which act on the moisture of the food to generate heating to achieve the cooking object. During the cooking process much moisture of the food will be lost and the food will become hardened. Furthermore, when cooking bulk mass food items, the food often incur a hardened surface yet insufficiently heated interior. To solve this problem, many companies have designed microwave ovens with steam generating system to let the microwave ovens have the function of steam cooking to ensure that the food items maintain enough moisture after being cooked in microwave ovens.

There are two main forms of the steam generating system of the microwave oven in the prior arts. In the first form, such as "the microwave oven with steam generating device" disclosed in the Chinese PAT. No. CN200320118994.4, the main structure of the microwave oven comprises a microwave oven body, a control board and a control circuit, and there are a detachable rack, a water droplet generating mechanism and a steam generating mechanism in the cavity of the microwave oven, the mechanisms being connected to the control circuit, the water droplet from the drip tube dripping on the heating plate to generate steam for cooking, thus ensuring that the food items maintain enough moisture. The heating plate has a heating component inside, and its bottom is attached on the inside surface of the cavity of the microwave oven. As a consequence, the cavity will be distorted after certain time, and the heating plate will accumulate dirt deposit, so the steam generated is not pure.

In the second form, such as "microwave oven with steam cooking function" disclosed in Chinese PAT. NO. CN200320118995.9, the main structure comprises a cavity, a microwave emitting device, wherein the microwave emitting device connected to a control board via a control circuit, further comprises an aluminum shield plate with perforations to shield from the microwave, the shield plate separates the cavity of the microwave oven into two chambers arranged up-down or left-right, but it still comprises a boiler and a steam generating device, the steam generating device and the boiler are mounted in different chamber respectively. The main working principle of the oven is to use the microwave energy to act on the water in the steam generating device to generate high-temperature steam, which will cook the food in the boiler. Because the cavity is separated into two chambers, the space for hold food items to be cooked is reduced. Also, the grease or juice generated by the food drips on the steam generating device to pollute the water there, the steam generated by the polluted water will affect the food safety. Furthermore, because cooking is by steam only, so the cooking process is slow.

Similarly, other food processors such as toasters and grills and so on have the same or similar problems as well.

SUMMARY OF THE INVENTION

The present invention provides a steam generator for food processor, the major object of the present invention is to obviate the following disadvantages in the existing food processors: 1) the water source for steam generation is easily polluted by the food items, such that the generated steam is not pure, adversely affecting food safety and taste or flavoring; 2) the steam generating component occupies a large portion of space of the cavity of the microwave oven, resulting in reduced space for holding food; and 3) the heating unit of the steam generating device is easy to make the cavity distorted.

The above and other objects of the invention are achieved by providing a steam generator for food processor comprising a shell which separated into a sink and a steam generating chamber, the sink has an inlet for importing water from a water source, and the bottom of the sink has an outlet in communication with the steam generating chamber. There is only a small amount of water in the steam generating chamber, so it can generate steam rapidly when heated, thus has a high efficiency, and the water in the sink can be provided to the steam generating chamber continually, there is a heater inside the generating chamber for heating the flowed-in water, and a steam outlet in the steam generating chamber.

In another embodiment of the aforementioned steam generator for a food processor, the sink is a column-ring surrounding the outside of the generating chamber, and the heater protruding upwardly from the bottom of the steam generating chamber.

The shell includes an upper shell, a middle shell and a lower shell, wherein the lower shell comprises a bottom board and a first cylindrical side wall extending upwardly from the bottom board, the middle shell comprises a board laid on the first cylindrical side wall and a second cylindrical side wall extending upwardly from the laid board, and the upper shell comprises a top board covering the second cylindrical side wall and a third cylindrical side wall extending downwardly from the top board and connected to the laid board of the middle shell; the third cylindrical side wall is inside the second cylindrical side wall, and the space in the third cylindrical side wall formed the said steam generating chamber, and the space between the third cylindrical side wall and the second cylindrical side wall form the sink.

The water inlet may be arranged on the said second cylindrical side wall of the middle shell, and the steam outlet arranged on the top board of the upper shell, the water-out of the sink arranged in the connection between the bottom of the third cylindrical side wall and the laid board of the said middle shell.

The heater may be embedded in the middle of the board of the middle shell, and the lower portion of the board forms a cavity for containing the electric control device of the heater.

Further, the heater comprises a heating tube embedded inside connecting with the electric control device.

The periphery of the first cylindrical side wall of the said lower shell has an assembly emboss portion for connecting with the microwave oven, the first cylindrical side wall of the said lower shell and the second cylindrical side wall of the middle shell recess inwardly to form an assembly groove for connecting with the microwave oven.

From the above description of the present invention, and compared with the prior arts, the present invention has at least the following advantages: firstly, as the steam generator is separated from the cavity of the microwave oven and will not be polluted by the food, the generated steam is maintained pure all the time, which ensure food safety and taste. Moreover, the steam generating device does not occupy the space in the cavity of the microwave oven, and the heating unit of the steam generating device does not connect with the cavity of the microwave oven, so the cavity will not be distorted. In addition, the steam can be spouted in from the needed position of the cavity of the microwave oven by the guide of the conduit. This is different from the prior steam generators, wherein the steam can only rise from the bottom and will be blocked off by the food vessel. Thus, in the present invention the steam can be spouted on the food directly to replenish the moisture of the food, and can make the food loose fat if desired. The temperature can be controlled by a thermostat, so it is easy to adjust the temperature of the generated steam. The compact-conformation also ensures that the device can be manufactured separately, and assembled in the microwave oven conveniently. Finally, the users are easy to clean the generator.

DETAILED DESCRIPTION OF THE INVENTION

Preferred embodiments of the present invention will be described in detail with reference to the drawings.

Figure 1:
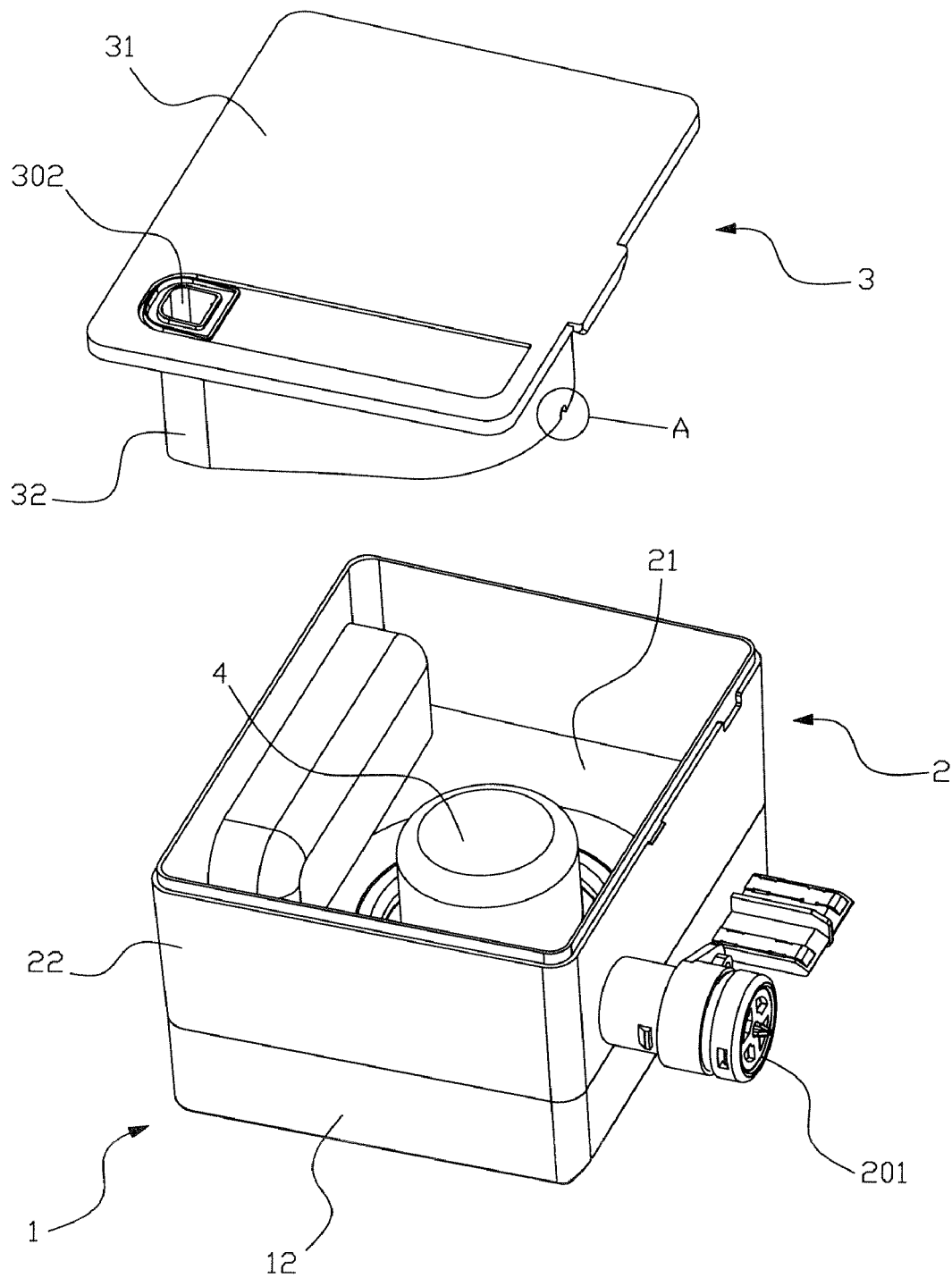
FIG. 1 is a perspective view of the present invention with the opened upper shell.
Figure 2:
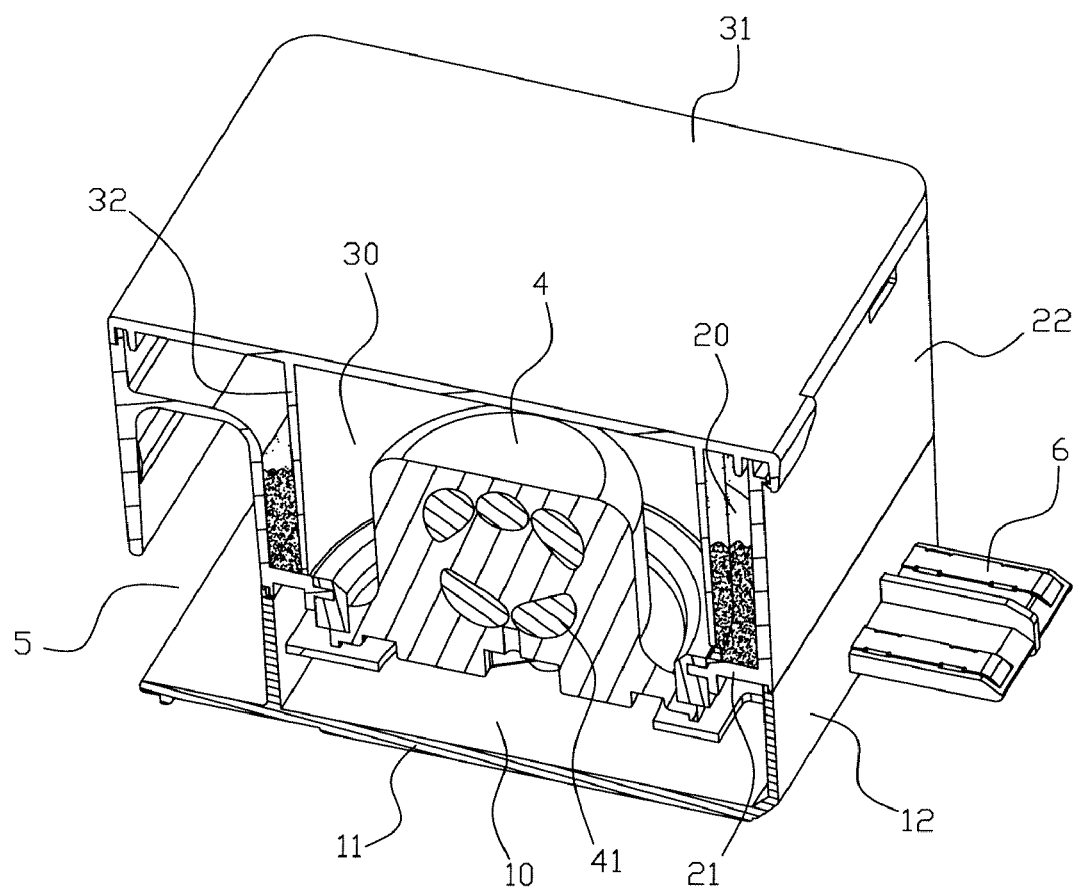
FIG. 2 is sectional view which shows the inside structure of the present invention.

Referring to FIG. 1, FIG. 2, a steam generator comprises a shell, the shell includes a lower shell 1, a middle shell 2 and an upper shell 3. The lower shell 1 comprises a bottom board 11 and a first cylindrical side wall 12 extending upwardly from the bottom board 11, the said middle shell 2 comprises a board 21 laid on the first cylindrical side wall 12 and a second cylindrical side wall 22 extending upwardly from the laid board 21, the said upper shell 3 comprises a top board 31 covering the second cylindrical side wall 22 and a third cylindrical side wall 32 extending downwardly from the top board 31 and connected to the laid board 21 of the said middle shell 2. The third cylindrical side wall 32 is inside second cylindrical side wall 22, and the space in the third cylindrical side wall 32 formed a steam generating chamber 30, the space between the third cylindrical side wall 32 and the second cylindrical side wall 22 formed the said sink 20 which surround the outside of the steam generating chamber 30.

Figure 3:
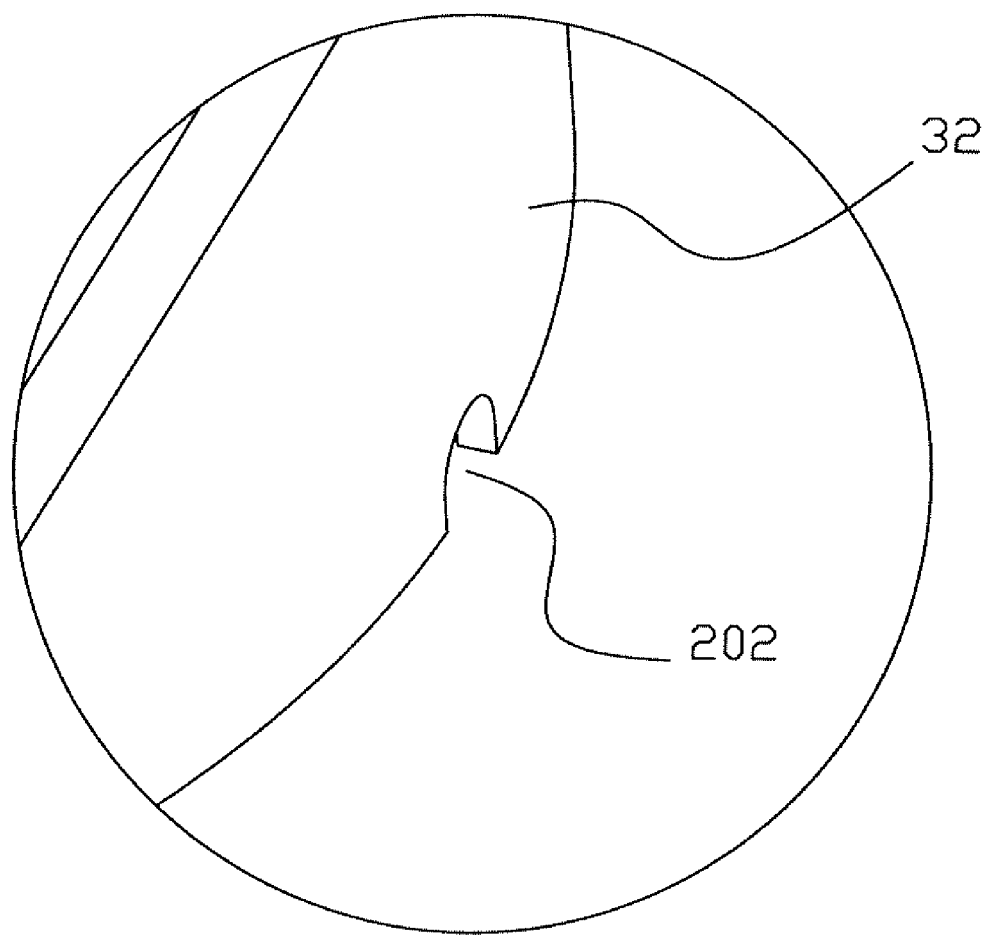
FIG. 3 is a partial enlarged view of the A of FIG. 1.

The said sink 20 has an inlet 201 for importing water from water source, and referring to FIG. 3, the bottom of the sink 20 has an outlet 202 in communication with the steam generating chamber 30, there is a heater 4 in the inside of the generating chamber 30 for heating the flowed-in water, and a steam outlet 302 on the top of the steam generating chamber 30.

The said inlet 201 arranged in the second cylindrical side wall 22 of the said middle shell 2, and is in communication with a tank which mounted moveably in the microwave oven via a tube, and the water in the tank can be imported into the sink 20. The said steam outlet 302 arranged on the top board 31 of the upper shell 3, and is in communication with the cavity of the microwave oven via a steam tube. The outlet 202 of the said sink 20 arranged on the connection between the bottom of the third cylindrical side wall 32 and the board 21 of the said middle shell 2, the water in the sink 20 flows into the steam generating chamber 30 via the outlet 202.

Referring to FIG. 1 and FIG. 2, the heater 4 embedded on the middle of the board 21 of the middle shell 2, and protruding up into the said steam generating chamber 30, the board 21 forms a space 10 for containing the electric control device of the heater 4. The said heater 4 has a heating tube 41 for connecting with the said electric control device, herein the electric control device is well understood by those of ordinary skill in the art, and does not be described in detail here.

Referring to FIG. 2, the periphery of the first cylindrical side wall 12 of the lower shell 1 has a assemble emboss portion 6 for connecting with the microwave oven, the first cylindrical side wall 12 of the lower shell 1 and the second cylindrical side wall 22 of the middle shell 2 recess inwardly to form a assembly groove 5 for connecting with the microwave oven. The assembly protrusion portion 6 and assembly groove 5 positioned on the two sides of the shell respectively so as to assemble the steam generator to the microwave oven conveniently and reliably.

The said steam generator can be used in the bakers or grills or the other food processors.

The above-mentioned descriptions are of exemplary embodiments only, and are not intended to limit the scope, applicability or configuration of the invention in any way. All changes that come within the meaning and range of equivalency of the claims are to be embraced within their scope.

What is claimed is:

1. A steam generator for a food processor comprising a shell which is separated into a sink and a steam generating chamber, wherein the sink has an inlet for importing water from a water source, and a bottom of the sink has an outlet in communication with the steam generating chamber, and wherein the steam generating chamber comprises a heater inside for heating flowed-in water, and a steam outlet,
wherein the sink surrounds the outside of the steam generating chamber, and the heater protrudes upwardly from the bottom of the steam generating chamber,
wherein the shell includes an upper shell, a middle shell and a lower shell, the lower shell comprising a bottom board and a first cylindrical side wall extending upwardly from the bottom board, the middle shell comprising a board laid on the first cylindrical side wall and a second cylindrical side wall extending upwardly from the laid board, the upper shell comprising a top board covering the second cylindrical side wall and a third cylindrical side wall extending downwardly from the top board and connected to the laid board of the said middle shell, wherein the third cylindrical side wall is inside the second cylindrical side wall, the space in the third cylindrical side wall forms the steam generating chamber, and the space between the third cylindrical side wall and the second cylindrical side wall forms the said sink.

2. The steam generator for food processor according to claim 1, wherein the water inlet is arranged on the second cylindrical side wall of the middle shell, and the steam outlet arranged on the top board of the upper shell, the water-outlet of the sink connects the bottom of the third cylindrical side wall and the laid board of the said middle shell.

3. The steam generator for food processor according to claim 1, wherein the heater is embedded in the middle of the board of the middle shell, and the lower portion of the board forms a cavity for containing an electric control device of the heater.

4. The steam generator for food processor according to claim 3, wherein the heater has a heating tube embedded inside which connects with the electric control device.

5. The steam generator for food processor according to claim 1, wherein the periphery of the first cylindrical side wall of the lower shell has an assembly portion for connecting with the microwave oven.

6. The steam generator for food processor according to claim 5, wherein the second cylindrical side wall of the middle shell has an assembly portion for connecting with the microwave oven.

7. The steam generator for food processor according to claim 5, which comprises a microwave oven, baker or gill.

8. The steam generator for food processor according to claim 5, wherein the sink is a column-ring.

9. A microwave oven, a grill or a baker comprising:
a steam generator for a food processor comprising a shell which is separated into a sink and a steam generating chamber, wherein the sink has an inlet for importing water from a water source, and a bottom of the sink has an outlet in communication with the steam generating chamber, and wherein the steam generating chamber comprises a heater inside for heating flowed-in water, and a steam outlet,
wherein the sink surrounds the outside of the steam generating chamber, and the heater protrudes upwardly from the bottom of the steam generating chamber,
wherein the shell includes an upper shell, a middle shell and a lower shell, the lower shell comprising a bottom board and a first cylindrical side wall extending upwardly from the bottom board, the middle shell comprising a board laid on the first cylindrical side wall and a second cylindrical side wall extending upwardly from the laid board, the upper shell comprising a top board covering the second cylindrical side wall and a third cylindrical side wall extending downwardly from the top board and connected to the laid board of the said middle shell, wherein the third cylindrical side wall is inside the second cylindrical side wall, the space in the third cylindrical side wall forms the steam generating chamber, and the space between the third cylindrical side wall and the second cylindrical side wall forms the said sink,
wherein the periphery of the first cylindrical side wall of the lower shell has an assembly portion for connecting with the microwave oven.

\* \* \* \* \*